United States Patent
Conrad et al.

(10) Patent No.: US 6,879,719 B1
(45) Date of Patent: Apr. 12, 2005

(54) METHOD FOR MEASUREMENT OF FULL-TWO DIMENSIONAL SUBMICRON SHAPES

(75) Inventors: Edward W. Conrad, Jeffersonville, VT (US); David P. Paul, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/512,570

(22) Filed: Feb. 24, 2000

(51) Int. Cl.[7] .............................. G06K 9/48; G06K 9/00
(52) U.S. Cl. ..................... 382/199; 382/203; 382/318
(58) Field of Search ............................. 382/181, 199, 382/203, 318, 200, 312, 197; 356/496, 509, 388; 682/199, 200, 203, 190, 191, 192, 193, 194, 312

(56) References Cited

U.S. PATENT DOCUMENTS

| | | | | |
|---|---|---|---|---|
| 5,099,521 A | * | 3/1992 | Kosaka ...................... | 382/133 |
| 5,272,763 A | * | 12/1993 | Maruyama et al. ......... | 382/147 |
| 5,398,292 A | * | 3/1995 | Aoyama .................... | 382/199 |
| 5,487,116 A | * | 1/1996 | Nakano et al. ............. | 382/104 |
| 5,491,759 A | * | 2/1996 | Nagao et al. ............... | 382/199 |
| 5,825,914 A | * | 10/1998 | Tsuboi et al. ............... | 382/151 |
| 5,914,784 A | * | 6/1999 | Ausschnitt et al. ......... | 356/624 |
| 2003/0095710 A1 | * | 5/2003 | Tessadro ..................... | 382/199 |

FOREIGN PATENT DOCUMENTS

| | | |
|---|---|---|
| JP | 57-104371 | 6/1982 |
| JP | 61-88440 | 5/1986 |
| JP | 62-105006 | 5/1987 |
| JP | 03-081602 | 4/1991 |
| JP | 05-035872 | 2/1993 |
| JP | 05-307609 | 11/1993 |
| JP | 06-348836 | 12/1994 |
| JP | 08-136236 | 5/1996 |
| JP | 8-136236 | 5/1996 |
| JP | 10-065911 | 3/1998 |
| JP | 11-201919 | 7/1999 |
| JP | 11-237231 | 8/1999 |

OTHER PUBLICATIONS (1978),E–Beam Line Width And Pattern Location Measurement Tool, IBM Technical Disclosure Bulletin, vol. 21, No. 1, pp. 151.

E. Coombs, et al., (1991), "Two–Dimensional Atomic Force Microprobe Trench Metrology System", J. Vac.Sci. Technol., vol. B9, No. 6, pp. 3612–3616.

* cited by examiner

*Primary Examiner*—Leo Boudreau
*Assistant Examiner*—Tom Y. Lu
(74) *Attorney, Agent, or Firm*—Scully, Scott, Murphy & Presser; William D. Sabo

(57) ABSTRACT

A method and apparatus for extracting two-dimensional image shapes from image data on a pixel array. The method comprises the steps of selecting intensity vs. pixel information in a plurality of directions in the vicinity of an edge of the image shape, and recognizing scans with sufficient contrast as containing edge information. Acceptable scans are subjected to an edge detection algorithm, the edge location is detected, and a locus of points is generated, from the detected edge values, that define the two-dimensional shape of the image. The edge detection algorithm may be a user defined edge detection algorithm that is tailored to the application. Also, in a preferred embodiment, the selecting step includes the step of selecting intensity vs. pixel information in at least four directions, and the plurality of directions are angularly spaced apart at least about 22 degrees. With one embodiment, one of these directions may be normal to an approximate edge location.

18 Claims, 12 Drawing Sheets

INTENSITY VS POSITION
FOR 4 SCAN DIRECTIONS

INTENSITY VS POSITION

APPROXIMATE
EDGE LOCATION

METHOD FOR MEASUREMENT OF FULL-TWO DIMENSIONAL SUBMICRON SHAPES

BACKGROUND OF THE INVENTION

This invention generally relates to measuring submicron structures or shapes; and more specifically, the invention relates to measuring such shapes from electron beam images of the shapes. Even more specifically, the present invention relates to a measurement procedure and system particularly well suited for determining the relative position of edges of submicron structures or shapes formed by photolithography on semiconductor wafers.

As photolithography K factors continue to decrease and complex reticle enhancement techniques are employed, the printed shapes appearing on the wafer can vary dramatically from the design in both shape and location. The traditional metrics of line width and overlay, although still useful, often are inadequate for predicting many effects on product. A means of accurately measuring wafer images in a full two dimensions is required for a variety of applications including fully understanding effects of imaging, etching, and other wafer processing on product performance. Another especially important application of two-dimensional shape metrology is for use in the calibration of shape prediction models that are just becoming widely offered in the semiconductor industry.

Little has been done in the area of full two-dimensional submicron shape metrology. Early two dimensional submicron measurements are generally achieved with a top down SEM. Metrology SEMs are generally one-dimensional instruments, that scan in a single direction that is approximately normal to the edge to be detected. An edge detection algorithm is then applied to this signal. Early attempts at two-dimensional metrology with SEM's consist of multiple one-dimensional measurements (e.g. to evaluate a bar, a scan along the width will be followed by a different scan along the length). This treatment of shapes is generally inadequate for many applications in terms of quantity of data and it is customary for the scans to be independent (i.e. the two scans are not connected by a coordinate system with a single origin).

SUMMARY OF THE INVENTION

An object of this invention is to improve methods and systems for measuring submicron shapes.

Another object of the present invention is to use an image of a submicron shape to identify relative position of edges of that shape.

These and other objectives are attained with a method and apparatus for extracting two-dimensional image shapes from image data on a pixel array. The method comprises the steps of selecting intensity vs. pixel information in at least one direction in the vicinity of an edge of the image shape, and recognizing scans with sufficient contrast as containing edge information. Acceptable scans are subjected to an edge detection algorithm and the edge location is detected. The locus of points generated from applying edge detection at multiple points around the image define the two-dimensional shape of the image.

Any suitable edge detection algorithm may be used. That algorithm may be a user defined edge detection algorithm tailored for the application, and, for example, a threshold edge detection algorithm may be employed. Also, in a preferred embodiment, the selecting step includes the step of selecting intensity vs. pixel information in at least four directions, and the plurality of directions are angularly spaced apart at least about 45 degrees. With one embodiment, one of these directions may be normal to an approximate edge location.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The method being disclosed makes use of a two-dimensional SEM image which consists of a regular grid of detector signal values that have a one-to-one correspondence with the position of the electron beam. The detector signal is related to the number of electrons collected by one or more detectors as a function of beam location on the sample under investigation.

Figure 1:
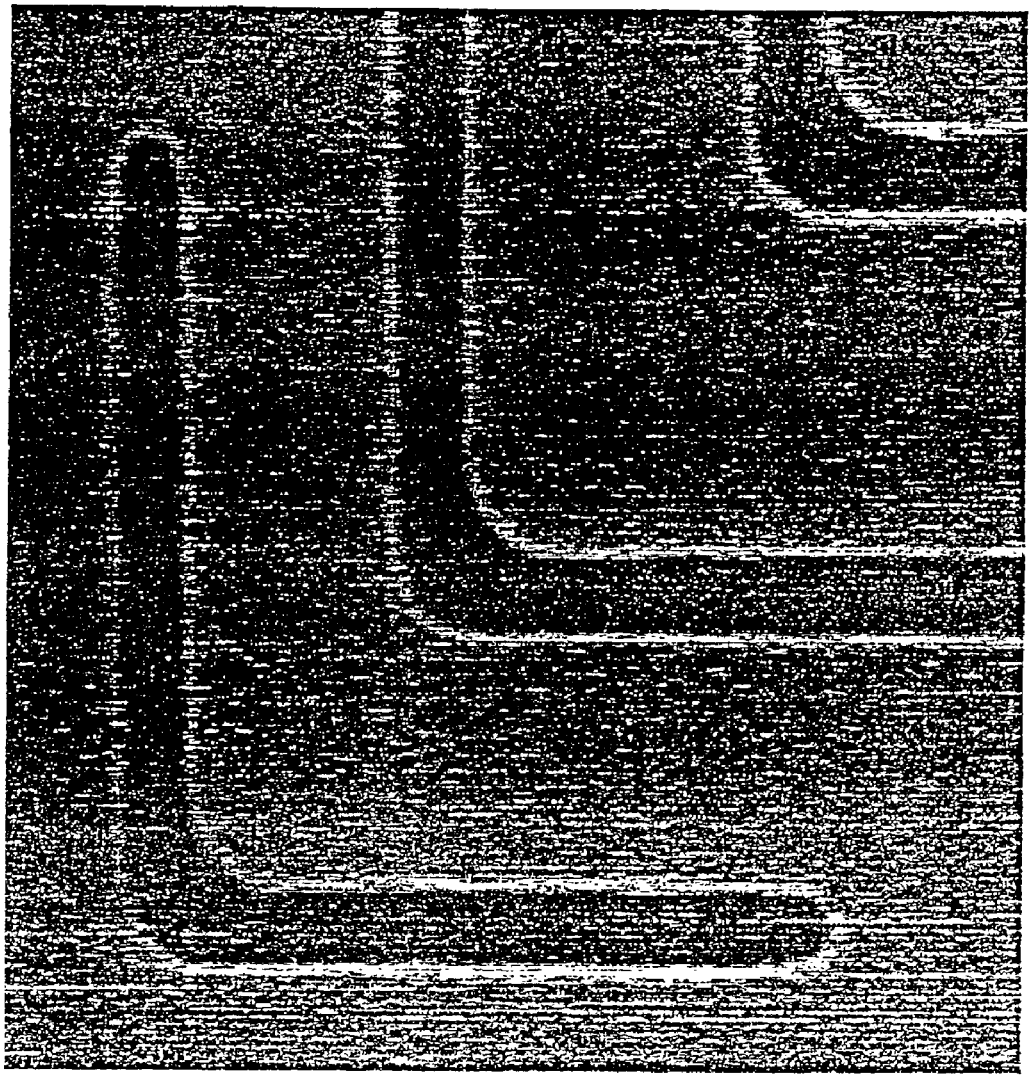
FIG. 1 shows an SEM micrograph of a resist "L" shaped structure.

FIG. 1 shows a typical SEM micrograph. The images in FIG. 1 comprise a set of "L" shapes which include corners such that edges are oriented at all angles from horizontal to vertical. Traditional SEM metrology of such a sample would require multiple mountings of the sample in various rotation states, or multiple scans with a rotated beam. For high accuracy measurements, each of the beam rotation states requires a separate calibration.

Figure 2:
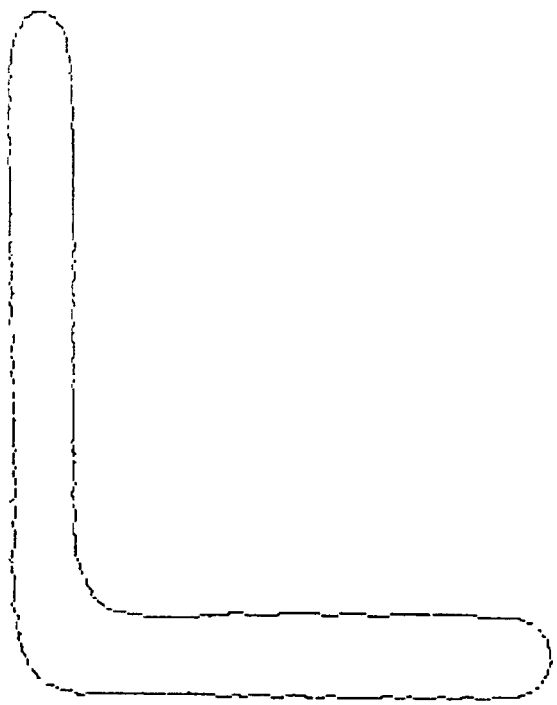
FIG. 2 shows the plot of a shape using constant contour intensity approximation.
Figure 3:
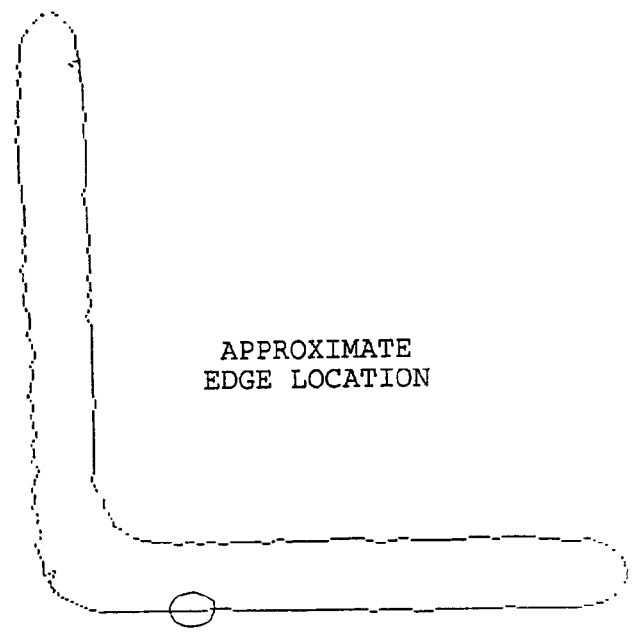
FIG. 3 shows the area of an "L" shape that was selected for scans.
Figure 4:
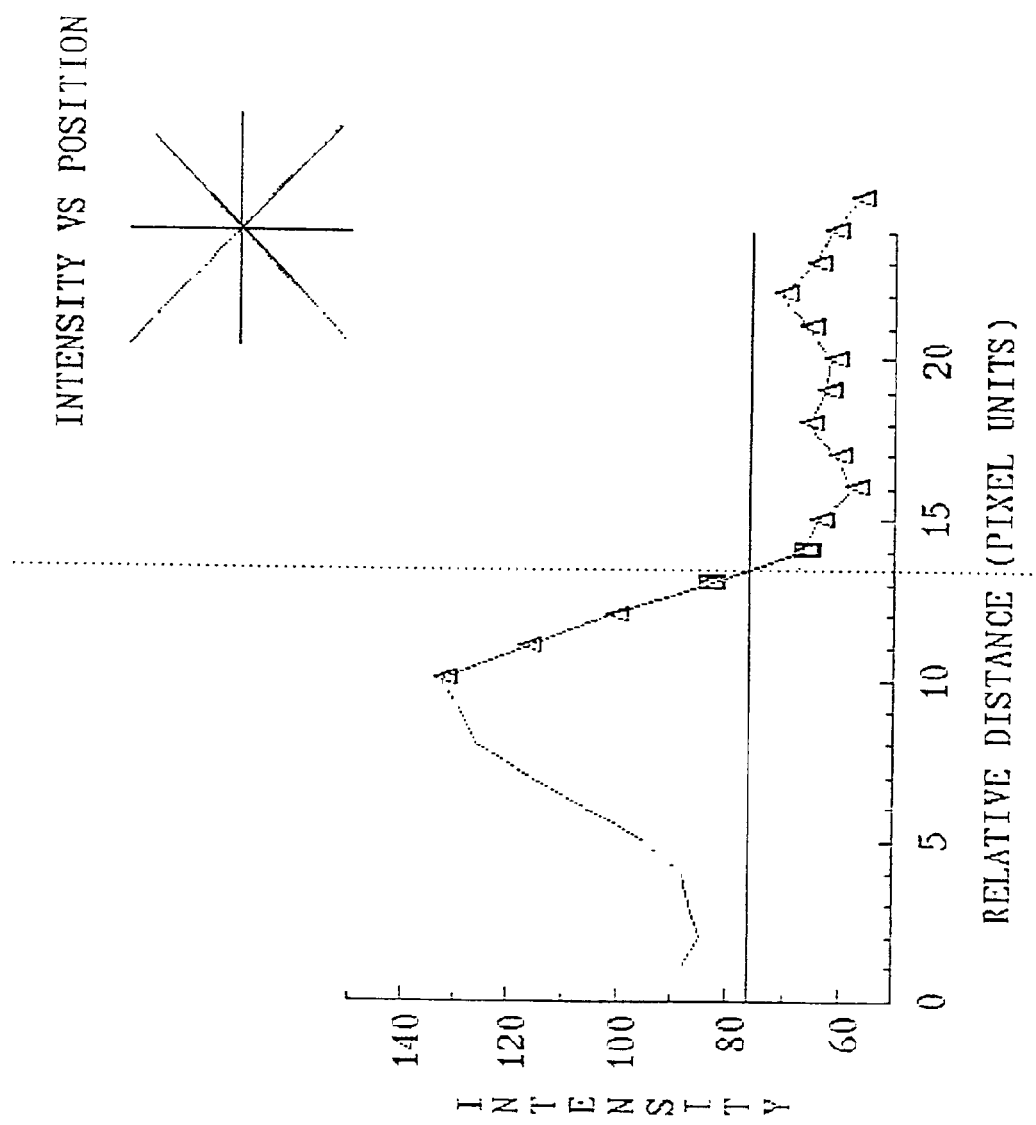
FIG. 4 is a graph of the intensity value vs. pixel location for the pixels along a forty-five degree scan.
Figure 5:
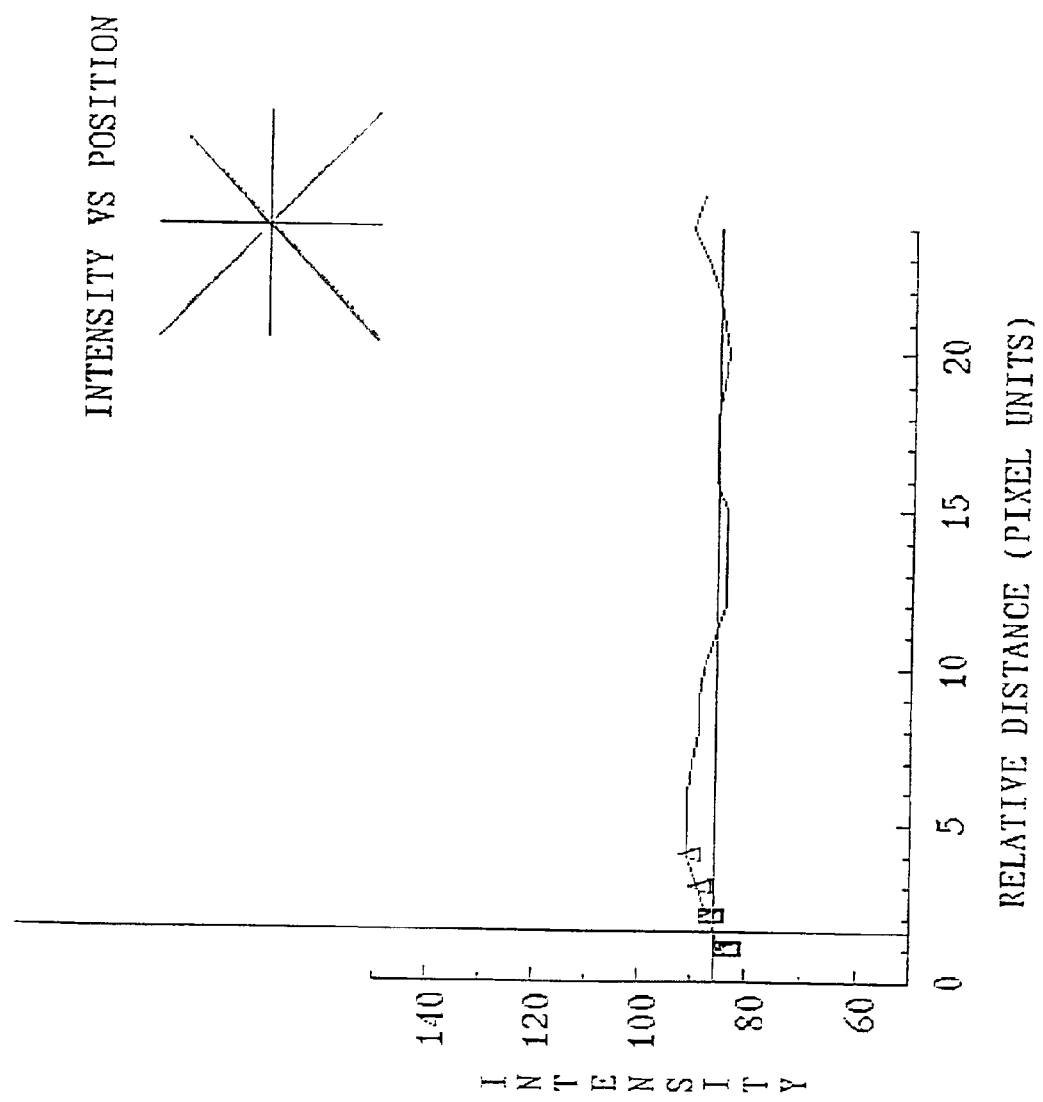
FIG. 5 is a graph of the intensity value vs. pixel location for the pixels along a horizontal scan.
Figure 6:
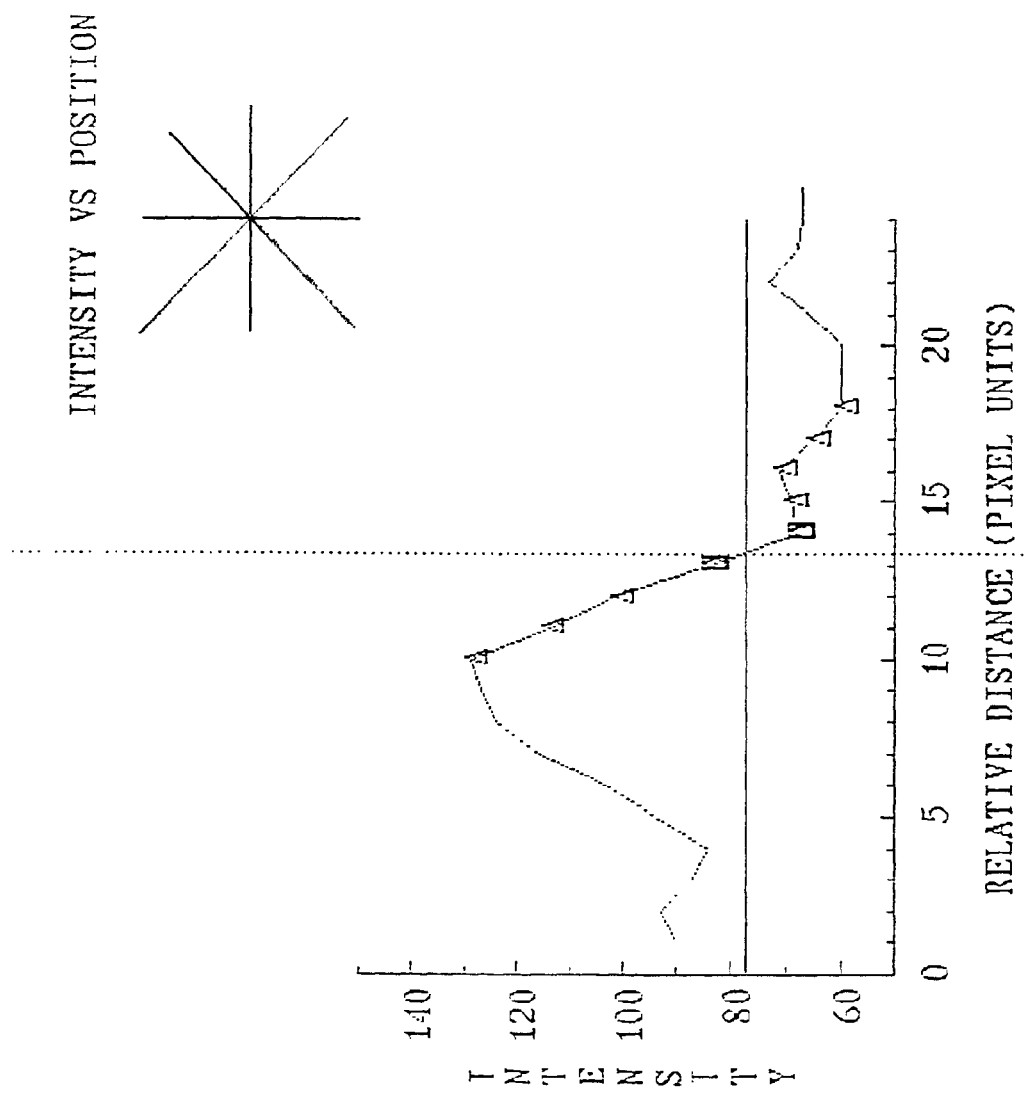
FIGS. 6 and 7 show graphs of the intensity value vs. pixel location for the pixels along two additional scans suitable for edge detection.
Figure 7:
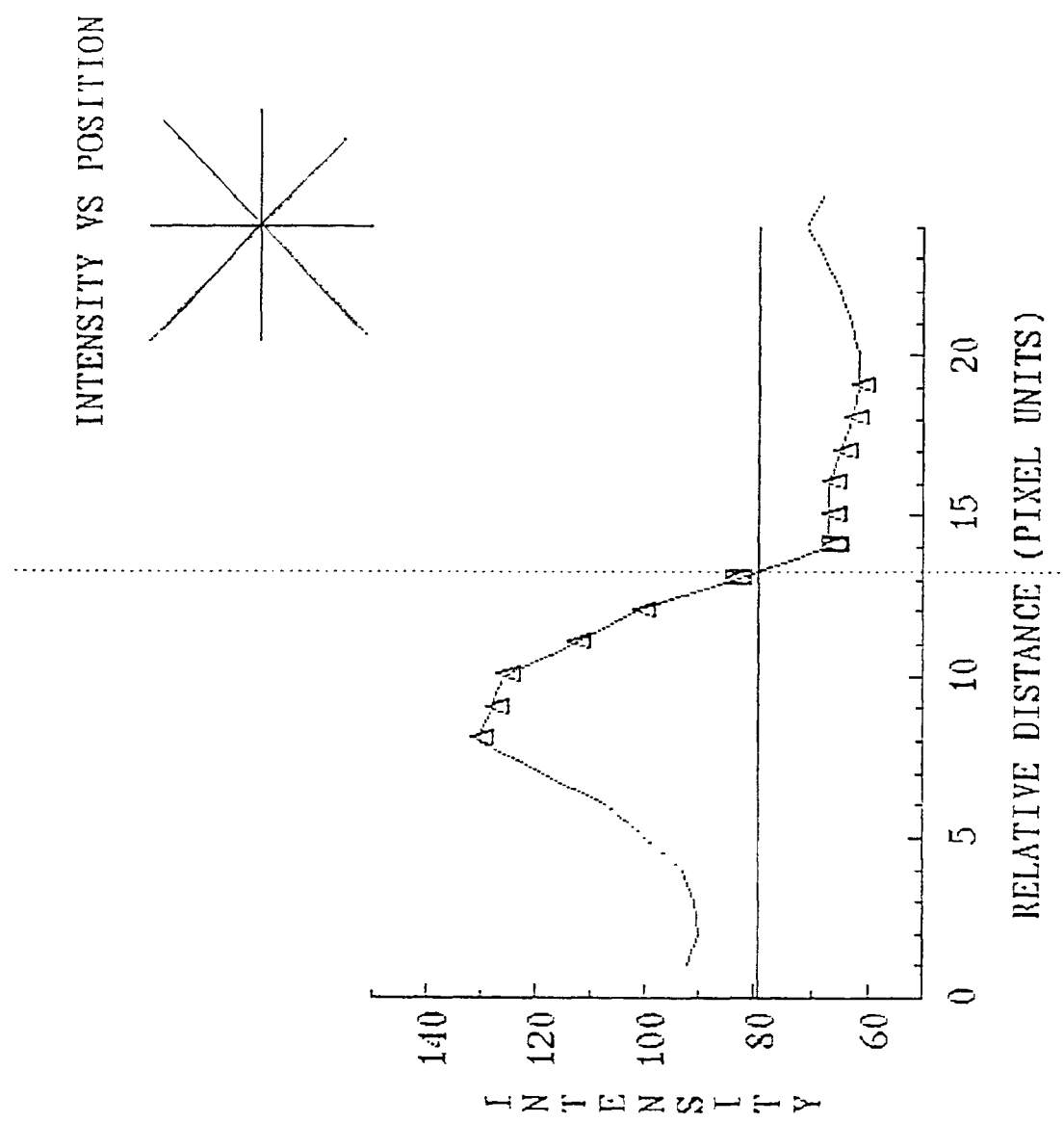
Figure 8:
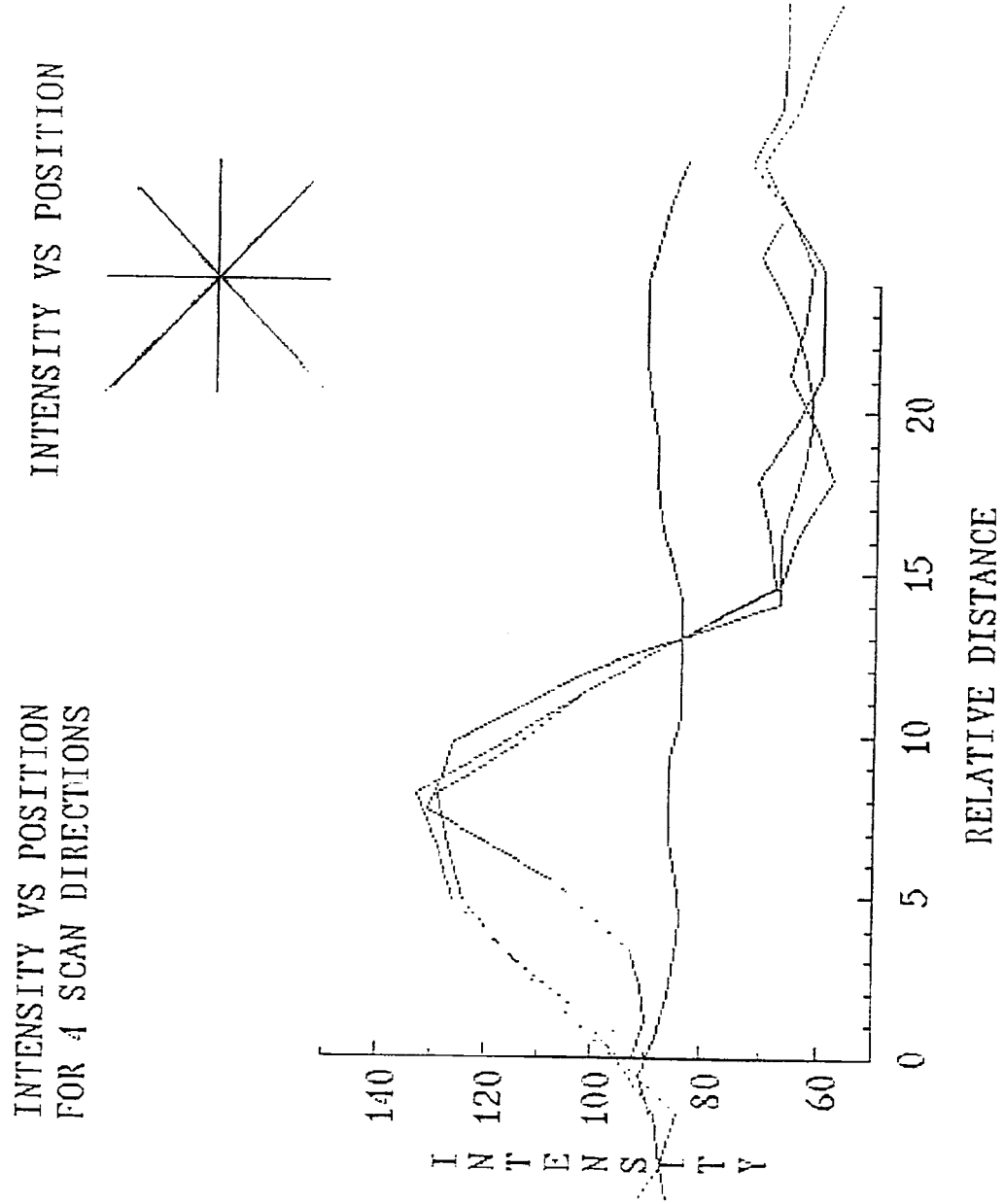
FIG. 8 shows the graphs of FIGS. 4–7 superimposed.

The method disclosed herein makes use of the fact that the detector signal peaks in the vicinity of an edge, as shown in FIG. 3. Since the edge is at a higher intensity than the rest of the background a relatively high constant intensity contour gives an approximate estimate of the edge location, as shown in contour plot of FIG. 2. Using this approximate edge location as a starting point, a line or scan of pixel intensities can be selected that passes through the approximate edge pixel location in any of many directions.

It is possible to make use of the normal to the approximate edge location and interpolation to produce intensity vs. position for lines that pass through the approximate edge at very close to normal. However, in practice it is found that by selecting intensity vs. pixel location for four directions, the edge can be reliably detected. Four scans ensures that a scan will be no more than 22.5 degrees off from the normal to the edge. More or less scans would also, generally, produce acceptable results.

FIGS. 4–8 show selected pixel intensity vs. pixel number for the x direction, the y direction, and each of the two +/−45-degree directions the designated (circled) area at the bottom of the shape in FIG. 3. Three of the four scans show good "contrast" (or range of intensity variation) as the edge is crossed. The horizontal scan shows no significant change in intensity with pixel number since the scan is along the direction of the edge. By sorting the data based on this contrast, poor quality scans that will produce erroneous edge location values (especially those that run nearly parallel to and edge) can be detected and discarded from the data.

Figure 9:
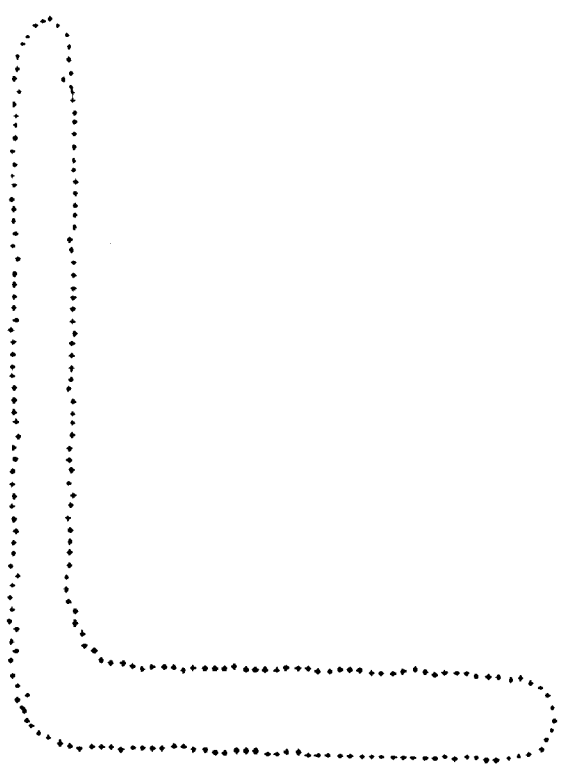
FIG. 9 shows the measured shape resulting from a method embodying the present invention.

By applying this four-scan method to all pixels near the edge of the shape of interest, it is possible to produce a full two-dimensional image shape where each point on the edge shares a common origin. The result is shown in FIG. 9. In particular, to obtain the result shown in FIG. 9, four scans were applied at each of the constant intensity points until the entire shape was tested.

Figure 10:
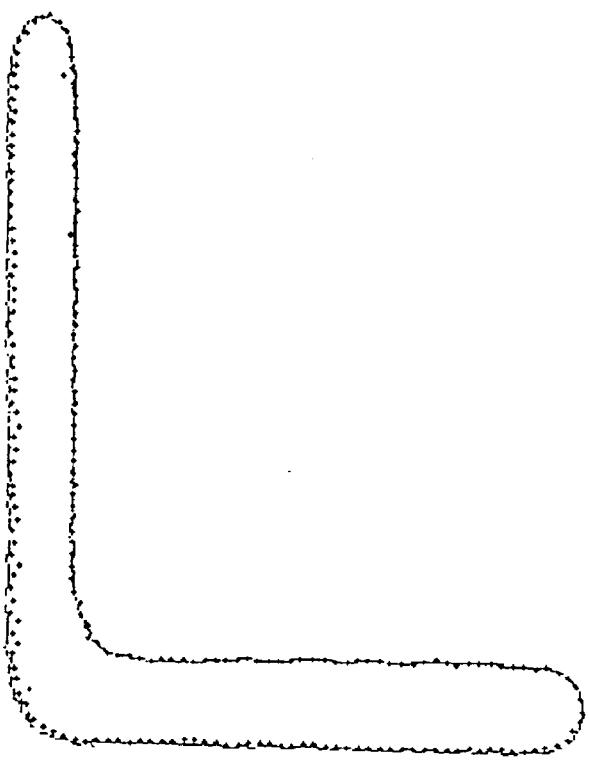
FIG. 10 shows the shape of a structure determined by using a constant intensity method, and the shape of the same structure determined by using a method embodying this invention.
Figure 11:
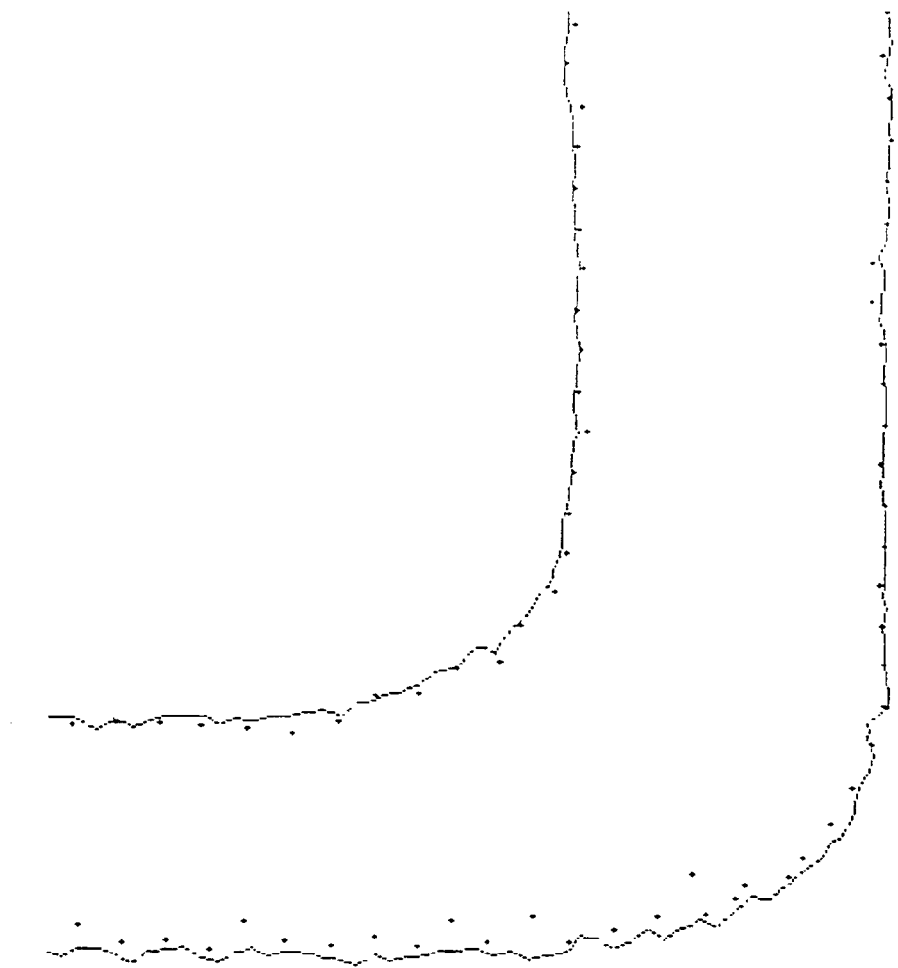
FIGS. 11 and 12 show enlarged portions of FIG. 10.
Figure 12:
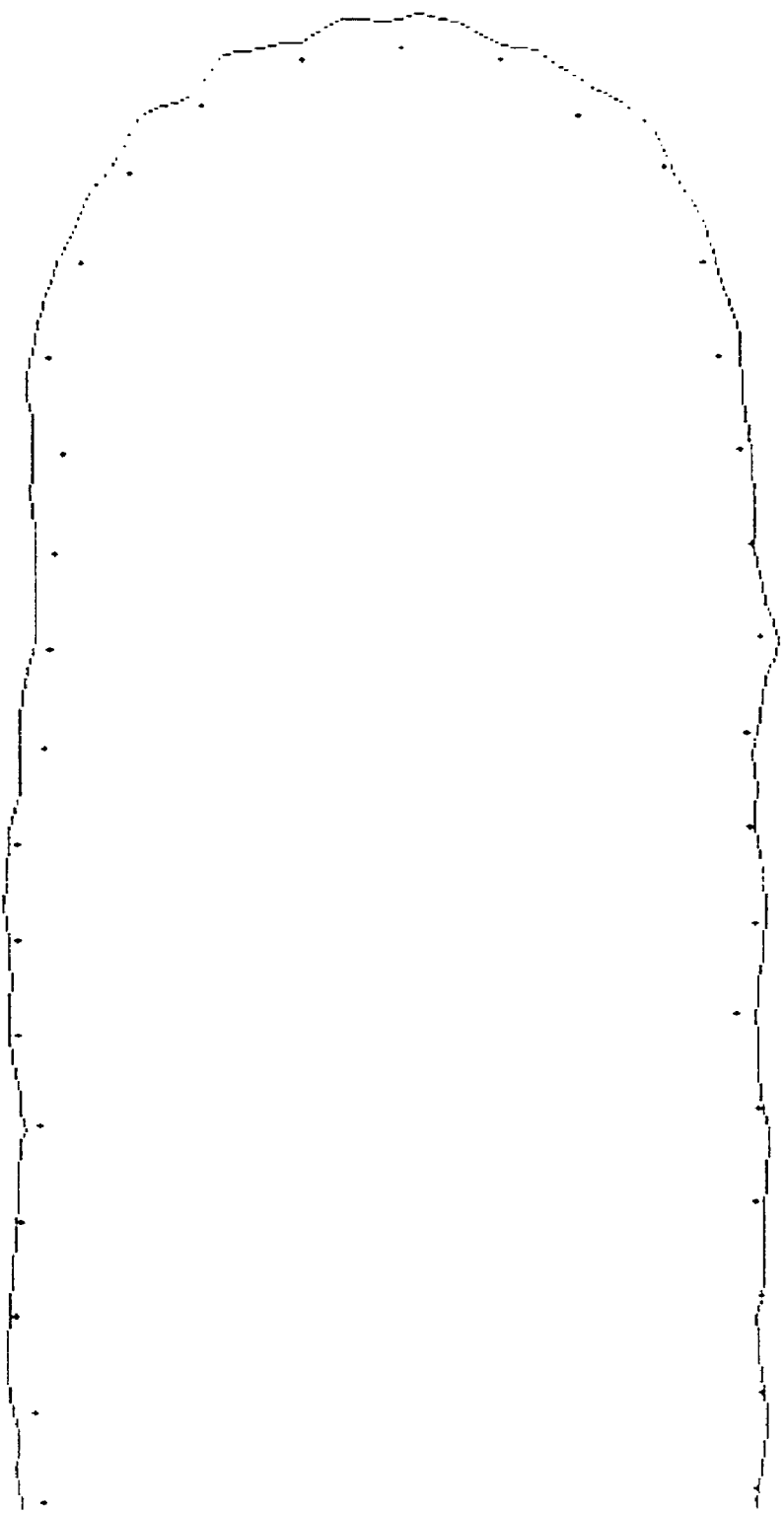

FIG. 10 shows both the shape measured by using a constant intensity method and the shape measured by using a method embodying this invention. FIGS. 11 and 12 show enlarged portions of FIG. 10. It should be noted that the method of this invention, in comparison with the constant intensity approximation method, produces a narrower vertical line width for the constant intensity value and edge detection algorithm used here.

Although the technique disclosed herein was developed for SEM metrology, it applies equally well to other detection devices, such as optical, AFM, and SFM.

Figure 13:
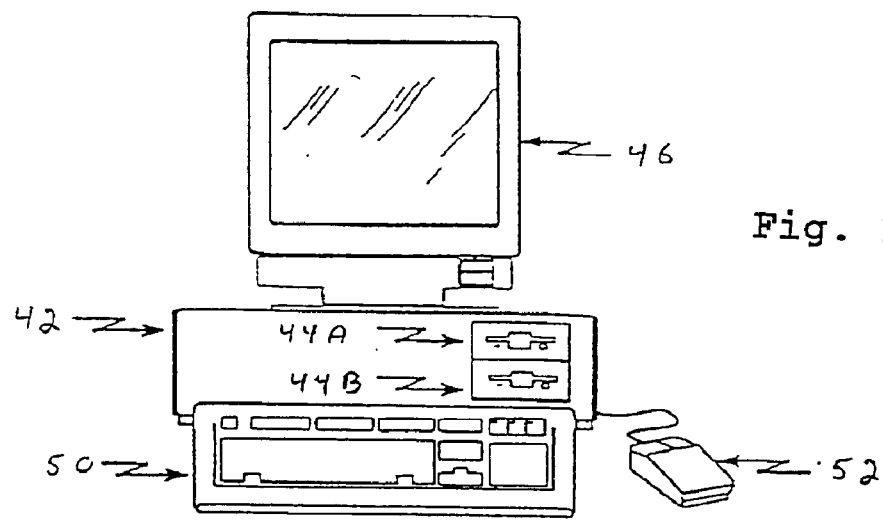
FIGS. 13 and 14 show a computer system that may be used in the invention.

The data processing needed to perform this invention may be done on any suitable computer, and FIG. 13 illustrates, as an example, a computer of a type that may be used in the practice of this invention. Viewed externally in FIG. 13, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

Figure 14:
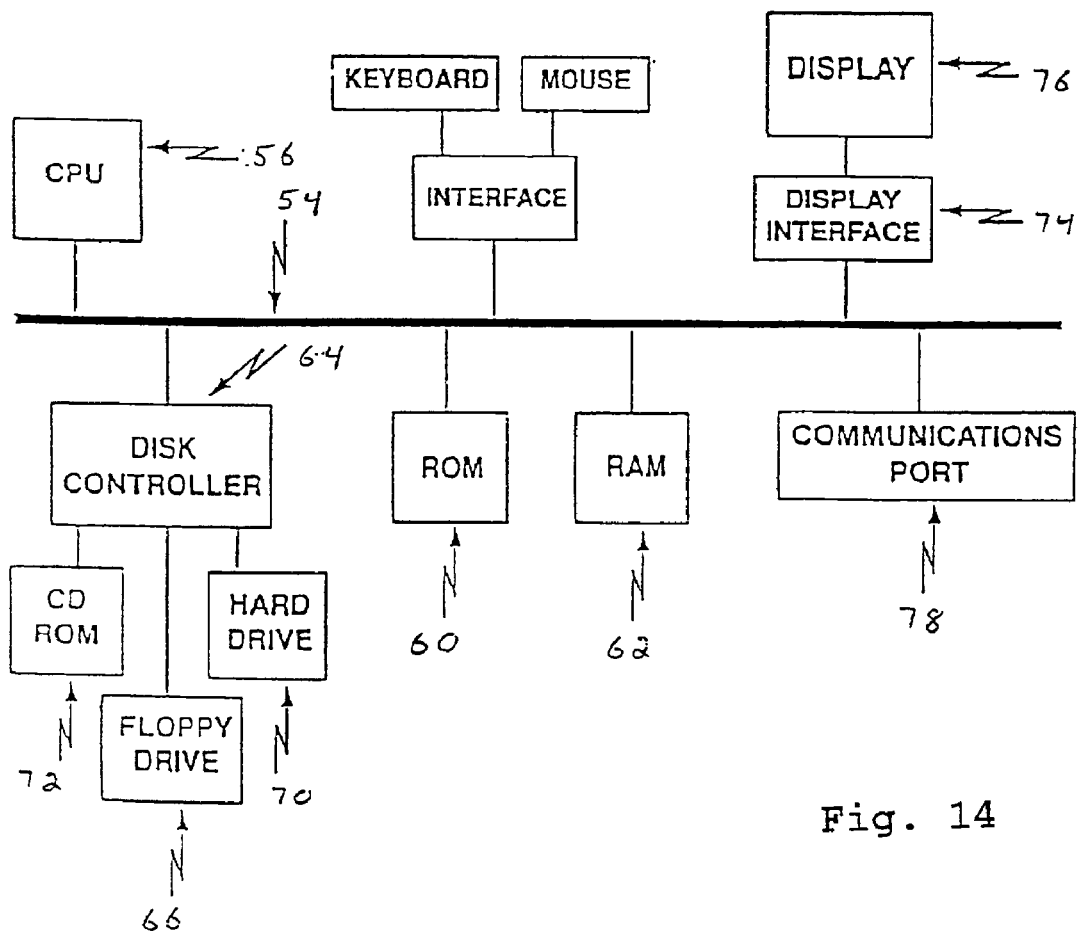

FIG. 14 shows a block diagram of the internal hardware of the computer of FIG. 13. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 15:
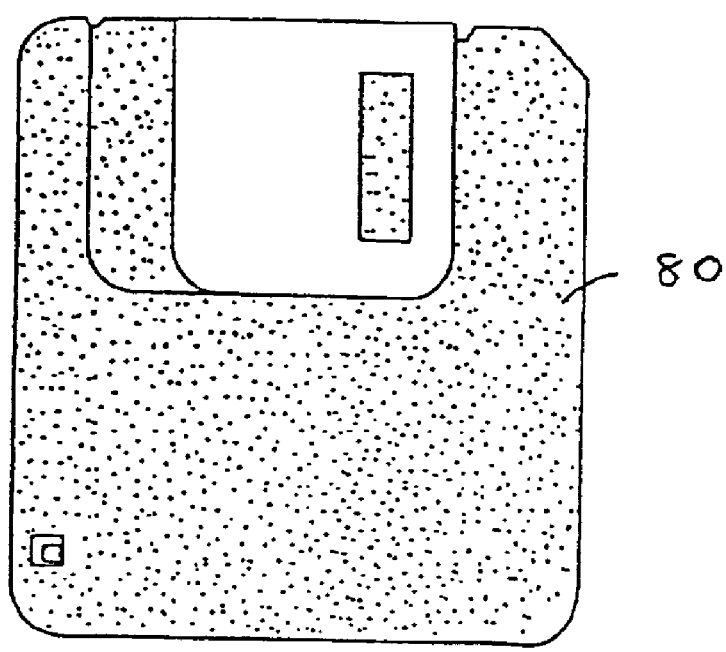
FIG. 15 illustrates a memory medium that can be used to hold a computer program for carrying out this invention.

FIG. 15 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of extracting two-dimensional image shapes of submicron structures formed by photolithography on semiconductor wafers, from a two-dimensional array of pixel data, the method comprising the steps of:

using a photolithography process to form a submicron structure on a semiconductor wafer;

forming an electron beam image of said structure on a two-dimensional array of pixels, wherein said images has a shape;

identifying a preliminary, approximate edge image shape;

identifying a more precise edge of the image shape by a) identifying a point along said approximate edge, b) obtaining intensity vs. pixel information along a plurality of scans extending in different directions, through substantially said point, in the vicinity of the edge of the image shape;

c) recognizing scans with sufficient contrast as containing edge information;

d) subjecting the recognized scans to an edge detection algorithm;

e) detecting a point on the more precise edge location of the image by using said edge detection algorithm; and f) repeating steps b), c), d) and e) for different points along the approximate edge to generate a locus of points that define the two-dimensional shape of the image from the detected edge values.

2. A method according to claim 1, wherein the edge detection algorithm is a user defined edge detection algorithm that is tailored to the application.

3. A method according to claim 1, wherein the obtaining step includes the step of obtaining intensity vs. pixel information in at least four directions.

4. A method according to claim 1, wherein one of said directions is normal to the approximate edge location.

5. Apparatus for extracting two-dimensional shape information form an image, of a submicron structure, formed on an array of detectors, comprising:

means for using a photolithography process to form a submicron structure on a semiconductor wafer;

means for forming an election beam image of said structure on a two-dimensional array of pixels, wherein said image has a shape;

means for identifying a preliminary approximate edge of the image shape;

means for identifying a more precise edge on the image shape by a) identifying a point along said approximate edge, b) obtaining intensity vs. detector location information for detectors on a plurality of scans in a plurality of angularly different directions, through substantially said point, in the vicinity of the edge of the image;

c) identifying scans having sufficient pixel contrast to provide edge information;

d) processing identified scans according to an edge detection algorithm to identify a point on the more precise edge of the image; and e) repeating functions b), c), and d) for different points along the approximate edge to generate a locus of points that define the two-dimensional shape of the structure from the identified edge points.

6. Apparatus according to claim 5, wherein the edge detection algorithm is a user defined edge detection algorithm that is tailored to the application.

7. Apparatus according to claim 5, wherein the plurality of directions includes at least four directions.

8. Apparatus according to claim 5, wherein one of said directions is normal to an approximate edge location.

9. A program storage device readable by machine, tangibly embodying a program of instructions executable by the machine to perform method steps for extracting two-dimensional image shapes of submicron structures formed by photolithography on semiconductor wafers, from image data on a pixel array, the method steps comprising:

using a photolithography process to form a submicron structure on a semiconductor wafer;

forming an electron beam image of said structure on a two-dimensional array of pixels, wherein said image has a shape;

identifying a preliminary, approximate edge of the image shape;

identifying a more precise edge of the image shape by a) identifying a point along said approximate edge, b) obtaining intensity vs. pixel information along a plurality of scans extending in different directions, through substantially said point, in the vicinity of the edge of the image shape;

c) recognizing scans with sufficient contrast as containing edge information;

d) subjecting the recognizable scans to an edge detection algorithm;

e) detecting a point on the more precise edge location of the image by using said edge detection algorithm; and f) repeating steps b), c), d) and e) for different points along the approximate edge to generate a locus points that define the two-dimensional shape of the image from the detected edge values.

10. A program storage device according to claim 9, wherein the edge detection algorithm is a user defined edge detection algorithm that is tailored to the application.

11. A program storage device according to claim 9, wherein the obtaining step includes the step of obtaining intensity vs. pixel information in at least four directions.

12. A program storage device according to claim 9, wherein one of the directions is normal to an approximate edge location.

13. A method according to claim 1, wherein the plurality of directions are angularly spaced apart about 22½ degrees.

14. A method according to claim 1, wherein the plurality of directions are angularly spaced apart about 45 degrees.

15. Apparatus according to claim 5, wherein the plurality of directions are angularly spaced apart about 22½ degrees.

16. Apparatus according to claim 5, wherein the plurality of directions are angularly spaced apart about 45 degrees.

17. A program storage device according to claim 9, wherein the plurality of directions are angularly spaced apart about 22½ degrees.

18. A program storage device according to claim 9, wherein the plurality of directions are angularly spaced apart about 45 degrees.

* * * * *